Daniel B. Shipp
George F. Walker
INVENTORS

BY Emil W. Milan
Attorney

3,536,562
PROCESS FOR FORMING BONDED POLYMERIC
SEALANT FILLED EXPANSION JOINTS
Daniel B. Shipp and George F. Walker, Trenton, N.J.,
 assignors to Thiokol Chemical Corporation, Bristol,
 Pa., a corporation of Delaware
Continuation-in-part of application Ser. No. 550,588,
 May 17, 1966. This application Mar. 23, 1967, Ser.
 No. 625,280
Int. Cl. E01c *11/10;* E04f *15/14;* C09l *3/30*
U.S. Cl. 156—242                          11 Claims

ABSTRACT OF THE DISCLOSURE

Bonded, filled expansion joints and laminated structures comprising in combination a cohesive, adhesive sold mass of a polymeric sealant composition at least partially embedded in and adhesively self-bonded to a set hydraulic cement-aggregate concrete are made by embedding the sealant composition either in shaped, cured form, or in an in situ shaped, and curable or settable form, into, unset, freshly-poured concrete substrate at the desired location and allowing the concrete to set. The sealant composition preferably is triangular in cross-section and is embedded with one vertex of the triangle pointing inward into the body of the concrete. This manner of embedment provides a potential line of weakness along which the set concrete may crack upon expansion while the sealant composition remains cohesive and adhere to the concrete substrate and provides an already existing barrier over the intentially created crack, against passage of fluid therethrough.

CROSS-REFERENCES TO RELATED APPLICATIONS

This application is a continuation-in-part of our copending application Ser. No. 550,588 filed May 17, 1966.

BACKGROUND OF THE INVENTION

Adhesively bonding concrete and other hydraulic cementitious materials to various substrates and forming adhesive joints in such materials has received considerable attention in recent years due to the rapid growth in the construction of roadways, airfields, docks, canals, buildings and the like. Though a variety of compositions have been used for forming adhesive joint seals in concrete and like materials and though the performance of these compositions has been generally satisfactory, the process conventionally employed in forming the joints is time consuming and tedious. Considerable time and effort must be expended to form a groove in the concrete and then to clean the groove in order to receive the sealant. This operation is frequently performed as follows: The fresh concrete is poured. At the points where joints are desired, a plastic divider having a V-shaped cross-section is worked into the fresh, unset concrete. After the concrete has set, the plastic divider is removed and the resulting groove is cleaned of dirt, oil or other debris which may have entered the groove in applying and/or removing the divider. The sealant is then applied to the groove. Failure to thus prepare and properly clean the groove of the set concrete will result in a final sealant joint which has an inferior or completely ineffective bond between the sealant and concrete.

SUMMARY OF THE INVENTION

According to the present invention, it has now been found quite unexpectedly that adhesive coatings and adhesive joint seals may be prepared by applying the coating or joint sealant composition to freshly poured unset hydraulic cementitious materials. It has also been found quite unexpectedly that curable sealant compositions which are customarily applied to set concrete in their uncured state and allowed to cure in place may be applied to unset hydraulic cementitious materials in their uncured state and in their cured state as well.

More specifically, the present invention provides a process for adhesively bonding a hydraulic cementitious substrate which comprises (1) applying a sealant to an unset hydraulic cementitious substrate, and (2) allowing said unset substrate to set.

The process of this invention when applied to sealing joints makes it possible, for example, to apply the sealant directly to the freshly poured, unset concrete substrate thereby eliminating the time consuming and costly steps of the conventional process, i.e., forming the groove with the divider, and cleaning the groove. Moreover, in the present process curable sealants including curable liquid sealants may be applied to the freshly poured concrete either before or after they have cured. By using a preformed sealant strip in forming the adhesive joint, it is possible to place the strip in the desired position on the roadbed or other surface and then to pour the fresh unset concrete around or over the strip. Since an adhesive rather than a mechanical seal is formed, any tendency for the strip to become displaced from its original position is substantially eliminated.

BRIEF DESCRIPTION OF THE DRAWING

The invention is illustrated in the accompanying drawing in which.

DESCRIPTION OF THE PREFERRED EMBODIMENTS

Figure 1:
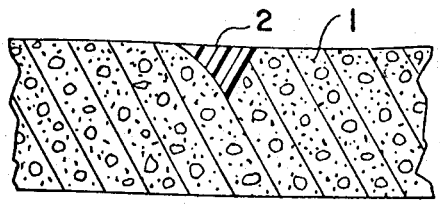
FIG. 1 shows cured sealant composition 2 which has been partially embedded and adhesively bonded to hydraulic cement-aggregate concrete 1 according to the invention.
Figure 2:
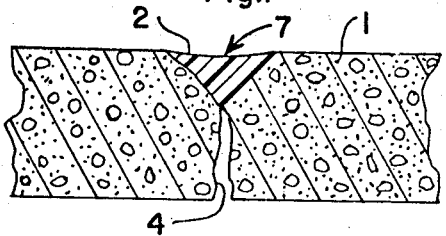
FIG. 2 shows the sealant composition 2 in a distended condition 7 after the substrate concrete 1 has developed a crack 4 due to stresses; the composition 2 is shown to have remained sealingly adhered to the concrete 1.
Figure 3:
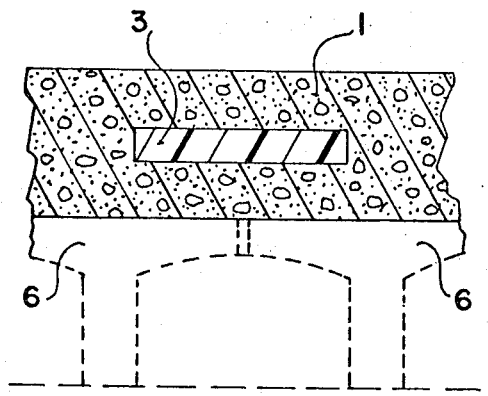
FIG. 3 shows sealant composition 3 which has been completely embedded and adhesively bonded in the concrete 1 during pouring of the concrete 1 over roof deck supports 6.
Figure 4:
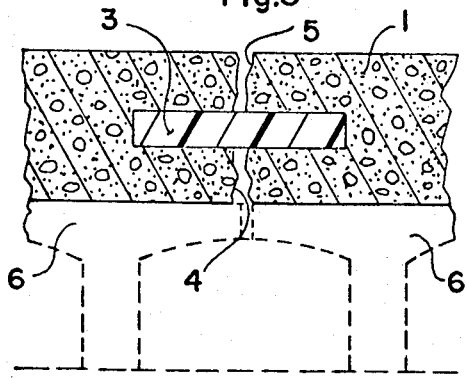
FIG. 4 shows the sealant composition 3 in a distended condition after the concrete 1 has developed cracks 4 and 5 below and above the sealant composition 3, respectively; the composition 3 is shown to have remained sealingly adhered to the concrete 1.

The sealants used in the present process may be any of the compositions conventionally employed to form coatings and/or joint seals in cured concrete and like cementitious substrates. The sealants ordinarily used for this purpose fall into two general categories, namely, "non-curing" sealants and "curable" sealants.

The term "non-curing" sealants is used herein to denote sealant compositions which do not undergo chemical reaction i.e., curing. Depending upon the particular composition employed, these sealants may be applied at ambient temperatures without preheating or may be heated to elevated temperatures and applied while hot. Generally, the sealants applied at ambient temperatures are pastelike in consistency and coalesce or solidify in place, for example, by solvent release. The hot applied non-curing sealants are usually thermoplastic in nature and thus, are heated to their plastic state to facilitate application after which they solidify in place upon cooling.

Among the "non-curing" sealants used in highway, canal and building construction are those based on bituminous materials including bituminous compositions which are ordinarily applied "cold," such as, low-melting point asphalts, blends of liquid and powdered bituminous materials and cut backs comprising blends of asphalt and petroleum distillates, e.g., kerosene, and bituminous compositions which are heated to pourable consistency at the time of application and applied hot, such as, paving grade asphalts, pitches, coal tar, and mixtures of bituminous materials and natural and/or synthetic rubber and/or resins e.g., rubberized asphalts and blends of coal tar pitch and vinyl resins. As used herein, "bituminous material" is intended to include substances containing bitumens or pyrobitumens, pyrogenous waxes and residues (pitches and pyrogenous asphalts) as derived from natural sources or from petroleum, coal, wood and so forth.

Other non-curing sealants include compositions based on natural and/or synthetic polymers, such as alkyd resins (reaction products of dibasic acids or their anhydrides and polybasic alcohols), polybutene resins, butyl rubber (copolymers of isobutylene and isoprene or butadiene), neoprene (polymers of chlorobutadiene and acrylonitrile), polysulfide rubber (reaction products of a polysulfide and an organic dihalide), chlorosulfonated polyethylene, and acrylate resins and rubbers (polymers of acrylic and/or methacrylic acids and/or their esters and/or acrylonitrile). In addition to the polymeric base material(s), these compositions may also contain compounding ingredients, such as, fillers, pigments, plasticizers, vegetable oils, and a volatile liquid vehicle, e.g. water or a volatile organic liquid.

The term "curable" sealants as used herein denotes sealant compositions comprising curable polymers that are transformed into a solid state by chemical reaction with a curing agent. These sealants may be supplied as a two- or multi-package system wherein the polymer and a curing agent for the polymer are packaged separately and admixed shortly before use, or they may be supplied as a one-package system wherein a dormant curing agent is admixed with the polymer and curing is activated, for example, by absorption of water from the atmosphere or by exposure to atmospheric oxygen.

Among the commonly used sealant compositions of this type are those based on liquid polymers, e.g. polymeric polythiopolymercaptans, polyepoxides, polyurethanes, and mixtures of polymeric polythiopolymercaptans and polyepoxides or polyurethanes. Other curable sealant compositions include those based on butyl rubber, neoprene, silicone rubber (polysiloxanes), acrylate polymers, and chlorosulfonated polyethylene. In addition to a curing agent(s) for the particular polymer(s) used, these compositions may also contain pigments, fillers, bituminous materials, cure accelerators, and ultraviolet light stabilizers. Both the curable and non-curing sealant compositions may additionally contain sand, mineral aggregate and adhesive additives, and also, they may be used in conjunction with adhesion primers. When these compounding ingredients are used with the base materials, they are employed in amounts to achieve the desired effect.

In carrying out the present invention, the sealant may be applied to the unset hydraulic cementitious substrate in any suitable and convenient manner using standard equipment as conventionally employed in applying coating and joint sealant compositions.

The present process may be used for forming joints in mortar, gypsum plaster, Portland cement, magnesium aluminate cement, so called magnesium oxychloride cement, concretes made from such cements, terrazzo, plaster of Paris, and like hydraulic cementitious materials. In addition, it may be used for applying these hydraulic cementitious materials to set concrete or other cementitious materials, wood, brick, lath, iron, steel, aluminum, copper, zinc and other metals, plastics, glass, glazed tile, ceramic tile and other heat fired surfacing materials, marble, granite and other natural stone, and the like.

The joints which may be formed by the process of this invention are the conventional joints for bonding together two bodies having a space between the adjacent surfaces of such bodies. The joints may also be those formed by placing a bead of sealant in the cementitious substrate so as to cause a point or line of weakness in such substrate. This latter method is often preferred from a commercial standpoint due to the savings in the amount of sealant used. The point or line of weakness thus created will generally assure that upon contraction or expansion of the substrate, a crack of the substrate, if any, will occur along this line of weakness, thereby turning the joint into a coventional joint, which because it is adhesively bonded to the cementitious substrate, prevents water or other liquid from passing through the crack and damaging the roadbed, sidewalk, or the like. A cross-section of the joints thus formed may be of various shapes, e.g. rectangular, square, round, triangular, or combinations of these. A preferred cross-section shape for the sealant bead is triangular with one side of the triangle forming part of the exposed surface of the cementitious substrate and with a vertex of such triangle pointing inward into the body of such vehicular and traffic installation. The joint may be completely submerged within the cementitious substrate or it may be placed at any point from the base of the substrate to the top of the substrate.

The following examples are merely illustrative of the invention described herein and are not intended as a limitation upon the scope thereof.

EXAMPLE 1

A sealant was prepared by preparing two compositions designated A and B, which when admixed in equal volumes, resulted in a rapidly setting admixture C, as follows:

|  | Parts by weight | | |
| --- | --- | --- | --- |
|  | A | B | C |
| Coal tar [1] | 110 | 75 | 180 |
| Polysulfide polymer [2] |  | 100 | 103 |
| Lead peroxide | 13 |  | 15 |
| Silica thickener |  | 25 | 25 |
| Carbon black filler | 17 |  | 17 |

[1] Coal tar oil fraction having a viscosity of less than 50 poises at 77° F.
[2] The polysulfide polymer had essentially the structure $HS(C_2H_4-O-CH_2-O-C_2H_4-S-S)_{23}C_2H_4-O-CH_2-O-C_2H_4SH$ with about 4% crosslinking or branching, a molecular weight of about 4,000 and an average viscosity at 77° F. of 400 poises.

(a) In one experiment, components A and B were admixed in equal volumes and the admixture was applied as a sealant strip to a block of set concrete within a minute or two of mixing, and allowed to cure for 24 hours at room temperature. The sealant strip was applied and tested for adhesion according to the procedure of ASTM #D903. The bond failed after 8 pounds per inch of pull was applied. The bond failure was in the sealant rather than at the interface between the concrete and the sealant and therefore was termed a "cohesive failure." When bond failure occurs at the interface between the concrete and sealant, it is termed an "adhesive failure."

(b) In a second experiment, a sample of the above described mixture C was poured into a ribbon-shaped tin mold having dimensions of 2" x 6" x ¼" and allowed to cure. The cure was complete after 9 minutes. Three hours after pouring into the mold the cured sealant strip thus formed was removed from the mold and was then pressed into the surface of some fresh unset concrete. The concrete was then allowed to set up for 48 hours. When tested on the Instron tensile tester at the end of this time in a manner similar to that described in ASTM #D903, the bond suffered cohesive failure after 8 pounds per inch of pull. Thus, the failure of the bond was not at the interface between the sealant and the concrete block, but rather was a break in the sealant itself.

EXAMPLE 2

Components A and B of Example 1 were admixed in equal volume, and the admixture was allowed to cure at room temperature for 30 days in the form of a ribbon shaped strip as in Example 1(b). The ribbon-shaped cured sealant strip thus formed was embedded in a freshly poured, unset aqueous admixture of Portland cement-aggregate. After 48 hours the bond between the sealant and the set concrete showed good adhesion. The bond when tested as in Example 1 gave "cohesive failure."

EXAMPLE 3

A sealant formulation was prepared by admixing components A and B of the following composition:

| | Parts by weight | |
|---|---|---|
| | A | B |
| Coal tar [1] | 10 | 10 |
| Polyepoxide [2] | | 100 |
| Polysulfide [3] | 100 | |
| Tris(dimethyl-aminomethyl) phenol | 10 | |

[1] Heavy coal tar oil fraction having a viscosity less than 50 poises a 77° F.
[2] The polyepoxide as prepared in the manner described for Polyether E of U.S. Pat. No. 2,633,458.
[3] The polysulfide polymer had essentially the structure

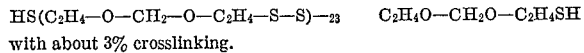

with about 3% crosslinking.

Immediately after admixing the sealant formulation was applied as a sealant strip or bead to an aqueous mixture of Portland cement-aggregate and tested as in Example 1 after the concrete had set up. The sealant showed good adhesion to the set concrete.

Example 4

A curable sealant formulation was prepared by admixing components A and B of the following composition wherein 6 parts by weight of B were used with 17.5 parts by weight of A.

| | Parts by weight | |
|---|---|---|
| Ingredients | A | B |
| Isocyanate-terminated urethane prepolymer [1] | 100 | |
| Dibenzoate ester of ethylene glycol-(plasticizer) | 75 | |
| Coal tar oil-viscosity of less than 50 poises 77° F. (extender) | 10 | |
| 4,4'-methylene-bis(2 chloroaniline) (chain extending agent) | | 1 |

[1] Urethane prepolymer prepared according to Example 1 of U.S. Patent 3,248,259.

Immediately after the two components were admixed, the sealant composition was used to prepare joint seals according to the present invention by applying the composition to a freshly poured, unset aqueous Portland cement-aggregate mixture. In preparing the joint seals, the composition was used to fill a joint between the opposite faces of two green, unset Portland cement strips spaced ½ inch apart after which the cement mix was allowed to set. The strips used were 6 inches long and 2 inches deep and 4 inches wide. For comparative purposes similarly prepared joints were formed using strips of set Portland cement-aggregate mix.

The joints thus prepared with both the freshly poured and set concrete mixes were pulled apart one-eighth inch, and water was applied to the top of each joint. The results of this test showed that the joints formed in both the set and unset concrete were water-tight even after the joints had been extended 25% by mechanical means. When the joints prepared by applying the sealant to unset cement were extended further by mechanical means to break the bond, it was found that the break was a cohesive rather than an adhesive failure.

EXAMPLE 5

A curable sealant composition was prepared by admixing components A and B containing the following:

| | Parts by weight | |
|---|---|---|
| Ingredients | A | B |
| SH-terminated polypropylene glycol liquid polymer having an approx. molecular weight between 2000 and 3000 | 300 | |
| Coal tar oil-viscosity of less than 50 poises at 77° F. (extender) | 300 | |
| Tris (dimethyl-aminoethyl) phenol | 10 | |
| Polyepoxide [1]-epoxide equivalent weight 185-200 | | 100 |

[1] Prepared in the manner described for Polyether E of U.S. Patent No. 2,633,458.

Immediately after admixing the two components, the above sealant formulation was used to prepare joint seals in both freshly poured and set Portland cement-aggregate mixtures in the same manner described in Example 4 above. When tested according to the procedure of Example 4, it was found that the joints formed in both the set and unset concrete were water tight and that the joint seals showed cohesive failures.

EXAMPLE 6

A non-curing sealant composition was prepared which contained the following ingredients:

Ingredients: Parts by wt.
Polymethacrylate resin in petroleum naphtha having a boiling range between 200 and 300° F.—40% total solids ____ 404.0
Sodium-zinc phosphate-(dispersing agent) __ 6.6
Polymeric polyester plasticizer ____ 66.5
Sodium salt of polymeric carboxylic acid— "Tamol" 850—(dispersing agent) ____ 1.2
Aliphatic petroleum solvent "Varsol" #1 (thinner) ____ 25.3
Calcium carbonate (filler) ____ 650.0
Titanium dioxide (pigment) ____ 16.6
Sodium polyacrylate solution (thickener) ___ 12.0
Coal tar oil-viscosity less than 50 poises at 77° F. ____ 50.0

Except for the coal tar oil, all of the above ingredients were weighed together and mixed until a homogeneous dispersion was obtained. Thereafter, the coal tar oil was added to the batch and mixing was continued until the coal tar was uniformly admixed with the other ingredients.

The sealant composition thus prepared was used to form joint seals in both freshly poured and set Portland cement according to the procedure described in Example 4. When the joint seals were extended 25% by mechanical means and water applied to the seals, it was found that the joints formed in both the set and unset cement were water tight and when extended further, that bond failure was due to cohesive failure.

EXAMPLE 7

A non-curing sealant was prepared containing the following ingredients:

Ingredients: Parts by wt.
Polysulfide rubber latex—50% total solids ____ 90
Butadiene-acrylonitrile copolymer latex—45% total solids ____ 10
Sodium polyacrylate (thickener) ____ 12
Sodium salt of polymeric carboxylic acid— "Tamol" 731—(dispersing agent) ____ 2
Calcium carbonate (filler) ____ 150
Titanium dioxide (pigment) ____ 15
Chlorinated hydrocarbon plasticizer containing 54% Cl (Aroclor 1254) ____ 150
Coal tar oil-viscosity less than 50 poises at 77° F. ____ 50

The above ingredients except for the coal tar oil were thoroughly admixed. The coal tar was then added and mixing continued until a homogeneous dispersion was obtained.

The resulting sealant composition was used to prepare joint seals in both freshly poured and set Portland cement mixtures in the same manner described in Example 4. When tested according to the procedure given in Example 4, the joints prepared in both the set and unset cement were found to be water-tight and in both cases, the joint seals failed cohesively.

We claim:
1. In a process for forming a shaped adhesively bonded, self-cohesive, sealed expansion joint and water barrier in a hydraulic cementitious material substrate which is bonded to the substrate and which will remain sealed against water under conditions of cracking, expansion and contraction of the adjacent substrate, by steps comprising depositing a mass of sealant composition at a desired joint and barrier location in or adjacent to the substrate, the improvement which comprises:
   depositing and embedding a mass of adhesive, curable polymeric sealant composition into essentially adhesively self-bonding contact with the hydraulic cementitious material substrate while the substrate is in an unset condition;
   said curable polymeric sealant composition consisting essentially of an uncured liquid polymer selected from a polymeric polythiopolymercaptan, polyepoxide, polyurethane and mixtures of polymeric polythiopolymercaptan and polyepoxide or polyurethane; bituminous material; and curing agent for the polymer.

2. A process according to claim 1 wherein said polymer is a polysulfide polymer.

3. A process according to claim 1 wherein said polymer is a polyacrylate polymer.

4. A process according to claim 1 wherein said composition comprises a polysulfide polymer and polyepoxide polymer.

5. A process according to claim 1 wherein said composition comprises a polyurethane polymer.

6. The process according to claim 1 comprising embedding the sealant composition in the form of a mass having a round or multi-sided cross-section.

7. The process according to claim 1 in which the cross-section of the sealant composition is triangular and has the vertex of the triangle pointing inward into the body of the substrate.

8. The process according to claim 1 comprising completely submerging the sealant composition within the cementitious substrate.

9. The process according to claim 1 comprising placing the sealant composition at any point from the base of the substrate to the top of the substrate.

10. The process according to claim 1 comprising placing the sealant composition in the space between two adjacent surfaces of unset substrate.

11. The process according to claim 1 comprising placing the sealant composition in a location in the unset substrate where it is desired to cause a line of weakness in the set substrate.

References Cited

UNITED STATES PATENTS

| | | | |
|---|---|---|---|
| 2,479,434 | 8/1949 | Van London | 94—18 X |
| 3,334,558 | 8/1967 | Atkinson | 52—396 X |
| 3,411,260 | 11/1968 | Dill | 52—396 |
| Re. 17,792 | 9/1930 | Pater | 52—396 |
| 2,910,922 | 11/1959 | Horning | 260—28 |
| 3,023,681 | 3/1962 | Worson | 52—396 XR |
| 3,238,165 | 3/1966 | Simpson et al. | 260—28 |
| 3,276,336 | 10/1966 | Crone | 94—18 |
| 3,310,511 | 3/1967 | Reinert | 156—330 XR |
| 3,316,194 | 4/1967 | Payne et al. | 260—28 |

JOHN T. GOOLKASIAN, Primary Examiner

G. W. MOXON II, Assistant Examiner

U.S. Cl. X.R.

52—396, 403, 573; 94—18, 20, 24; 156—327, 330, 331, 337; 260—28